United States Patent [19]
Kaneyasu et al.

[11] Patent Number: 4,984,545
[45] Date of Patent: Jan. 15, 1991

[54] CONTROL SYSTEM FOR INTERNAL COMBUSTION ENGINE

[75] Inventors: Masayoshi Kaneyasu, Hitachi; Nobuo Kurihara, Hitachiota, both of Japan

[73] Assignee: Hitachi, Ltd., Tokyo, Japan

[21] Appl. No.: 340,474

[22] Filed: Apr. 19, 1989

[30] Foreign Application Priority Data

Apr. 21, 1988 [JP] Japan .................................. 63-96681

[51] Int. Cl.⁵ ........................ F02D 41/14; B60K 31/00
[52] U.S. Cl. .................................. 123/399; 123/352;
  180/179; 364/426.04; 364/431.07
[58] Field of Search ........................ 123/352, 361, 399;
  180/178, 179; 364/426.04, 431.07

[56] References Cited
U.S. PATENT DOCUMENTS

| | | | |
|---|---|---|---|
| 4,760,825 | 8/1988 | Morita | 123/399 X |
| 4,811,713 | 3/1989 | Shimada et al. | 123/399 |
| 4,829,438 | 5/1989 | Etoh | 180/179 X |
| 4,833,612 | 5/1989 | Okuno et al. | 180/179 X |
| 4,843,553 | 6/1989 | Ohata | 364/426.04 |

FOREIGN PATENT DOCUMENTS

| | | | |
|---|---|---|---|
| 0126036 | 7/1984 | Japan | 123/399 |
| 0196937 | 11/1984 | Japan | . |
| 0196939 | 11/1984 | Japan | . |
| 0145339 | 7/1986 | Japan | . |
| 0171618 | 8/1986 | Japan | . |

Primary Examiner—Willis R. Wolfe
Attorney, Agent, or Firm—Antonelli, Terry, Stout & Kraus

[57] ABSTRACT

A control system for the internal combustion engine is disclosed, in which the operating conditions (such as vehicle speed) and the control conditions (such as throttle opening degree) of the operating elements of the internal combustion engine are used to determine a resistance index (such as an equivalent gradient) for specifying the driving force corresponding to the operating conditions under the prevailing load conditions. Further, this resistance index data is accumulated, so that the operating elements are controlled on the basis of a target operating condition and a corresponding resistance index.

21 Claims, 9 Drawing Sheets

CONTROL SYSTEM FOR INTERNAL COMBUSTION ENGINE

BACKGROUND OF THE INVENTION

The present invention relates to a control system for an internal combustion engine, or more in particular to an internal combustion engine control system in which a resistance index (such as an equivalent gradient) specifying the driving force for an operating condition (such as vehicle speed) under a prevailing load condition is calculated, thereby to effect an advance control rapidly responding to a target value for any operating condition.

Control systems for an internal combustion engine so far suggested are configured in such a manner that the state feedback control is effected in accordance with such quantities as the amount of supplied air, the amount of injected fuel, the rotational speed of the engine and the airfuel ratio, thereby to control the generated torque, engine speed and air-fuel ratio to optimum conditions as disclosed in JP-A-61-145339 and JP-A-61-171618.

On the other hand, throttle control system in which such an actuator, operating as a servo motor, is driven in accordance with a command from a control system to control the opening degree of the throttle valve is disclosed in JP-A-59-196937 and JP-A-59-196939.

The control systems for internal combustion engines suggested in the aforementioned Japanese patent publications assume that a dynamic model of an internal combustion engine controlled in a manner to attain an optimum gain by feedback control has a linear characteristic in the vicinity of an operating point, and no consideration is given to possible use of dynamic control to change the engine speed to a great measure, thus making it impossible to effect optimum feedback control over the entire range of operating points.

Also, no concept of advance control has been introduced for removing the transmission delay based on the internal structure or power transmission mechanism of an internal combustion engine, or the time delay before a change in the amount of supplied air or the fuel supply reaches a cylinder or the delay of rise time attributable to the complicated mechanisms. As a result, the problem is posed that it is impossible to dampen the vehicle vibrations caused by sudden changes in the amount of air or fuel supply.

A method of advance control has been suggested by JP-A-61-171618 in which a required drive torque is calculated from the difference between a target vehicle speed and an actual vehicle speed, and a fuel injection amount or a gear ratio is set on the basis of the value thus calculated. In view of the many factors involved in the calculation of the drive torque, however, this conventional system is incapable of accurate calculation of the required drive torque, and the amount of fuel injection or the gear ratio cannot be set under other than predetermined conditions.

SUMMARY OF THE INVENTION

The present invention has been developed in view of the inherent drawbacks of the control systems for internal combustion engines as mentioned above, and an object thereof is to provide a control system for an internal combustion engine in which a resistance index (such as an equivalent gradient) specifying the drive force for an operating condition (such as vehicle speed) under a prevailing load condition is calculated thereby to effect an advance control rapidly responding to a target value from any operating condition.

In order to achieve the above-mentioned object, according to the present invention, there is provided a control system for an internal combustion engine, which provides for controlling various operating elements by setting a target value to which the operating conditions of the internal combustion engine are controlled by control of the operating elements, detecting the operating conditions of the internal combustion engine and the control conditions of the operating elements, calculating a resistance index specifying the driving force corresponding to the operating condition under the prevailing load condition from the operating conditions of the internal combustion engine and the detected control amount of the operating elements, calculating the control amount of the operating elements and applying the control amount thus calculated in order to maintain the set target value, and storing in a memory the information required for calculation.

According to the present invention, a resistance index (such as an equivalent gradient) specifying the driving force corresponding to the vehicle speed under the prevailing load condition is calculated on the basis of an operating condition (such as vehicle speed) of the internal combustion engine and the detected control condition (such as the throttle opening degree), and the value thus calculated is written in the memory.

In response to a set target value (such as a target vehicle speed), the amount of controlling of the throttle opening degree is calculated from the target vehicle speed and the equivalent gradient under the prevailing load condition read from the memory. The throttle opening degree is controlled with this control amount thereby to effect an advance control of the internal combustion engine to attain a target vehicle speed.

DESCRIPTION OF THE PREFERRED EMBODIMENTS

Embodiments of the present invention will be explained in detail with reference to the accompanying drawings.

First, the basic operation of the present invention will be described with reference to a first embodiment shown in FIGS. 1 to 5.

Figure 1:
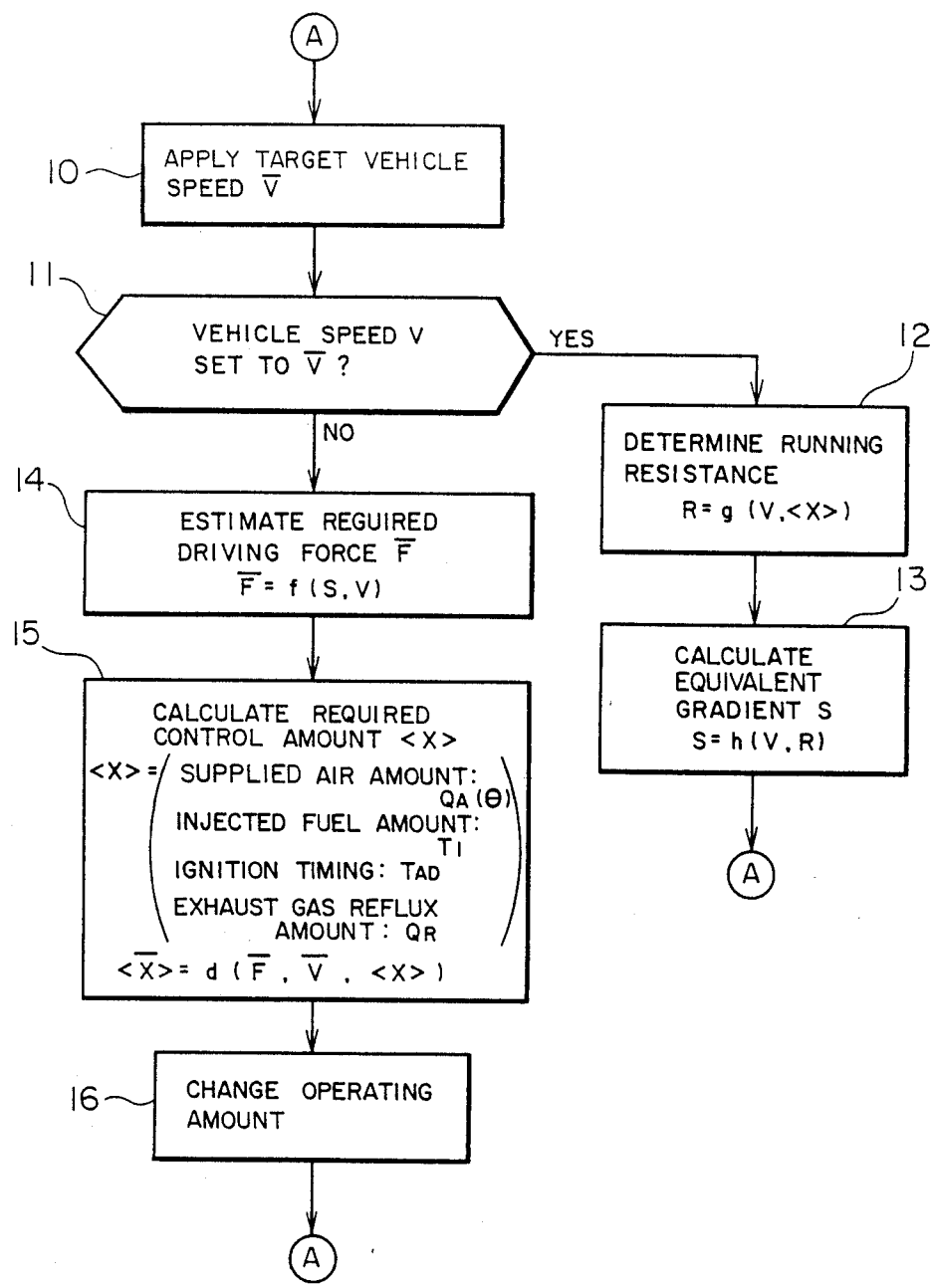
FIG. 1 is a flowchart showing the operation of a first embodiment of the present invention.

In FIG. 1, in step 10 a target vehicle speed $\bar{v}$ is received from a target value setting device such as a cruise control system or the accelerator pedal, whereupon the process is passed to step 11 for deciding whether the actual vehicle speed detected by a speed detector corresponds to the target vehicle speed $\bar{v}$, and if the answer is affirmative, the process proceeds to step 12 for determining a running resistance R.

The running resistance R is a function of the operating condition (the vehicle speed in the embodiment) and the control amount $<x>$ of the operating elements. The value $<x>$, in turn, is a vectorial amount including as components thereof the amount of air supply $Q_A(\theta)$, the fuel injection amount $T_1$, the ignition timing $T_{AD}$ and the exhaust gas reflux amount $Q_R$, where $\theta$ indicates the throttle opening degree.

Figure 2:
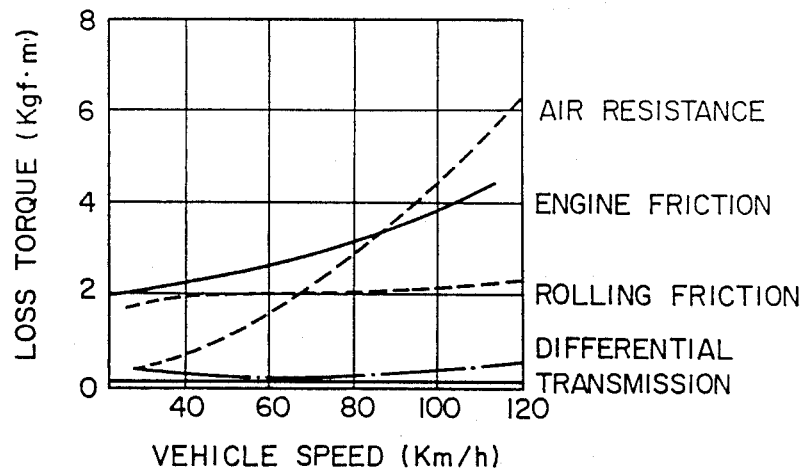
FIG. 2 is a diagram showing characteristics representing the relationship between various loss torques and vehicle speed.
Figure 3:
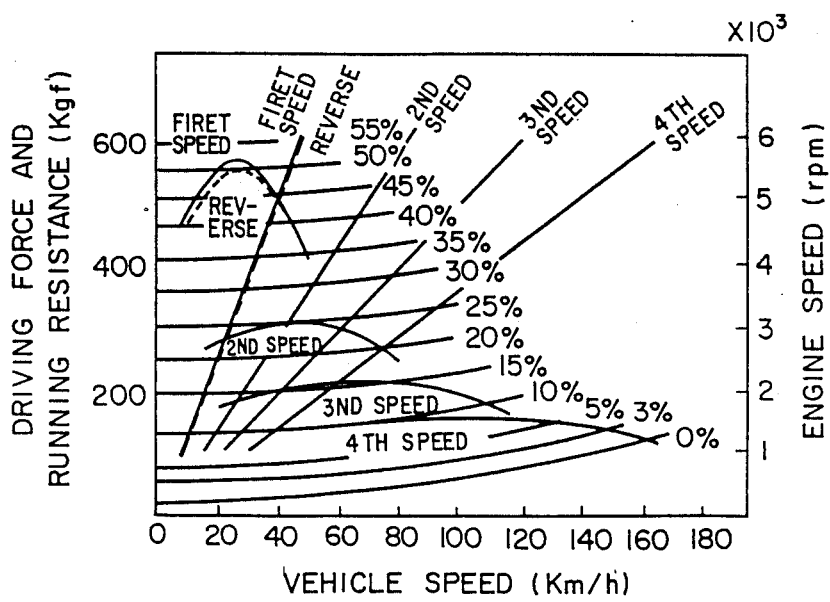
FIG. 3 is a diagram showing characteristics representing the relationship between the vehicle speed with the gear switching position as a parameter and the driving force or engine speed and the relationship between the vehicle speed with the equivalent gradient as a parameter and the driving force.

FIG. 2 is a diagram showing a relationship between the vehicle speed and various loss torques for a vehicle 1.25 tons in weight and 2000 cc in displacement. The running resistance R is represented by the losses shown in FIG. 2 to which the acceleration resistance and the gradient resistance are to be added. The running resistance R, as shown in FIG. 3, contains the air resistance under the prevailing load condition, and therefore assumes a quadratic curve. The maximum driving force is thus obtained for each gear switching position, and FIG. 3 indicates that the vehicle speed is proportional to the engine speed at each gear switching position.

Figure 4:
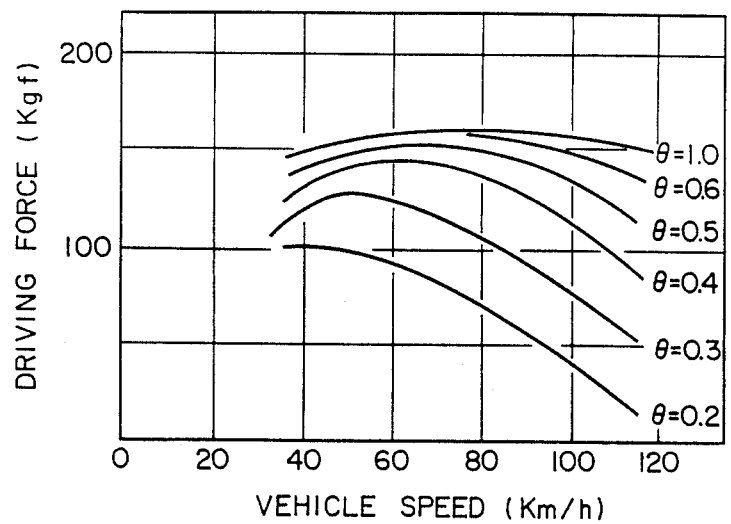
FIG. 4 is a diagram showing characteristics representing the relationship between the vehicle speed with the throttle opening degree as a parameter and the driving force.

The vehicle speed and the driving force, on the other hand, have a relationship as shown in FIG. 4 with respect to the throttle opening degree $\theta$, one control amount of the operating elements, as a parameter. By analyzing the diagrams of FIGS. 3 and 4 in combination, therefore, it is possible to determine the throttle opening degree $\theta$ for attaining a driving force required to maintain the target vehicle speed $\bar{v}$ for a given running resistance R.

An equivalent gradient S is thus used as a resistance index that is an index, of the running resistance given under the restrictions of various operating conditions as shown in FIG. 3, and this equivalent gradient S is used to combine the vehicle speed v, the running resistance R and the throttle opening degree $\theta$ with each other. In the explanation that follows, only the throttle opening degree is handled as a control amount $<x>$ of the operating elements for simplification.

The equivalent gradient S is a conversion of the running resistance excluding the acceleration resistance, and provides a basis for calculation of the running resistance according to the vehicle speed.

The function g for determining the driving force F mentioned above is given by the equation below.

$$F = g(v, \theta) \qquad (1)$$
$$= 224.6 - \frac{0.229}{\theta}(V + 29.0) - \frac{1080}{v + 3.31} - 0.212\,v$$

In equation (1), the first and second terms represent the weight of the supplied mixed gas and the third and fourth terms the resistance loss. Generally, the driving force F is always equal to the running resistance R, and therefore the equation (1) may be used as a function for determining the running resistance R, thereby leading to equation (2) below.

$$R = g(v, \theta) \qquad (2)$$

The function h(v, R) for determining the equivalent gradient S, on the other hand, is given by equation (3) below.

$$S = h(v, R) \qquad (3)$$
$$= \frac{1}{11.2}(R - 20 - 0.00437\,v^2)$$

In FIG. 1 again, step 12 determines the running resistance R using the equation (2), and step 13 determines the equivalent gradient S by use of the equation (3). These calculations are effected frequently at intervals of 10 msec, for example, and the results are written in memory. Even if the running resistance R changes during a braking operation, the control amount of the operating elements and the driving force F are calculated always on the basis of new running resistance data.

If step 11 in FIG. 1 determines that the vehicle speed v does not correspond to the target vehicle speed $\bar{v}$, the process proceeds to step 14 for estimating the required driving force $\bar{F} = f(s, \bar{v})$ from the following equation (4) obtained by solving the equation (3) for R.

$$F = f(s, v) \qquad (4)$$
$$= 20 + 11.2S + 0.00437\,v^2$$

The process then proceeds to step 15 for calculating the required control amount x capable of generating the required driving force $\bar{F}$ obtained in equation (4), by using the following equation (5) resulting from the solving of the equation (1) for 0, followed by step 16 for effecting control using the required control amount x obtained above, i.e. the throttle opening degree $\theta$ is changed.

$$\theta = d(F, v) \qquad (5)$$
$$= -\frac{0.229\,(v + 29.0)}{F - 224.6 + \frac{1080}{v + 3.31} + 0.212\,v}$$

The coefficients in equations (1) to (5) assume values varying with the speed change ratio in the power transmission system.

The operation of the aforementioned embodiment will be specifically explained with reference to FIG. 5.

Figure 5:
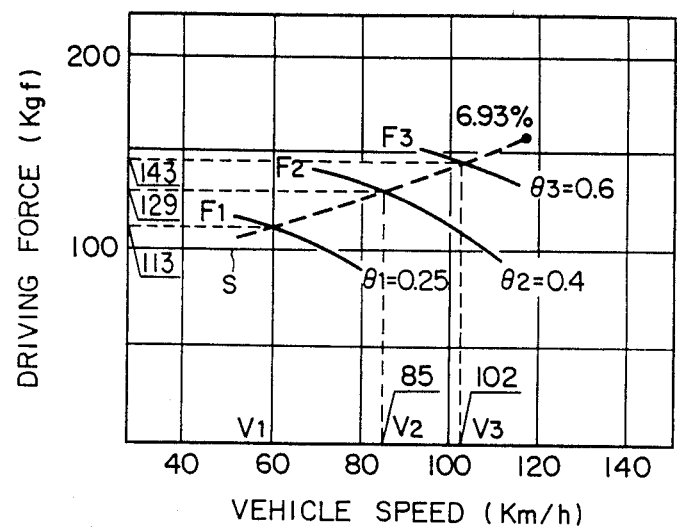
FIG. 5 is a characteristic diagram for explaining the operation of the first embodiment.

In FIG. 5, the vehicle is assumed to be running at steady speed of $v_1 = 60$ Km/h, with the throttle opening degree $\theta$ of $\theta_1=0.25$. The driving force involved is obtained as $F_1=113$ kgf by substituting the vehicle speed $v_1$ and the throttle opening degree $\theta_1$ into equation (1). The running resistance $R_1$ for this driving force $F_1$ is determined from equation (2), and therefore the equivalent gradient S of 6.9% is obtained from equation (3) on the basis of the running resistance $R_1$ and the vehicle speed $v_1$.

If the vehicle speed is to be changed to $v_3=102$ Km/h under the same conditions of running resistance, that is, if the vehicle speed $v_3$ is to be maintained under the running condition of the equivalent gradient S of 6.93%, the required driving force $F_3$ is given as 143 Kgf from equation (4). Also, the throttle opening degree $\theta_3$ for generating the driving force of 143 Kgf is 0.6 from equation (5). By controlling the engine to the throttle opening degree $\theta_3$ of 0.6 by the throttle valve control, therefore, the driving force $F_3$ of 143 Kgf is generated thereby to maintain the vehicle speed $v_3$ at 102 Km/h.

In a similar fashion, the vehicle speed $v_3$ may be reduced from 102 Km/h to $v_2$ of 85 Km/h under the same running conditions in such a manner that the driving force $F_2$ required for maintaining the vehicle speed $v_2$ is obtained as 129 Kgf from equation (4), and the throttle opening degree $\theta_2$ for generating the driving force $F_2$ is determined at 0.4 from equation (5). The throttle opening degree $\theta_2$ is controlled to 0.4 in this manner, thereby maintaining the vehicle speed at $v_2$ of 85 Km/h.

According to the present embodiment, as described above, in response to a target vehicle speed $\bar{v}$ from the target value setting means, the required throttle opening degree $\theta$ is instantaneously calculated for advance control, thus assuring a superior and rapid control of settling characteristics, which is impossible in the conventional internal combustion engine control systems.

The control operation with a specific system configuration according to a second embodiment will be explained.

Figure 6A:
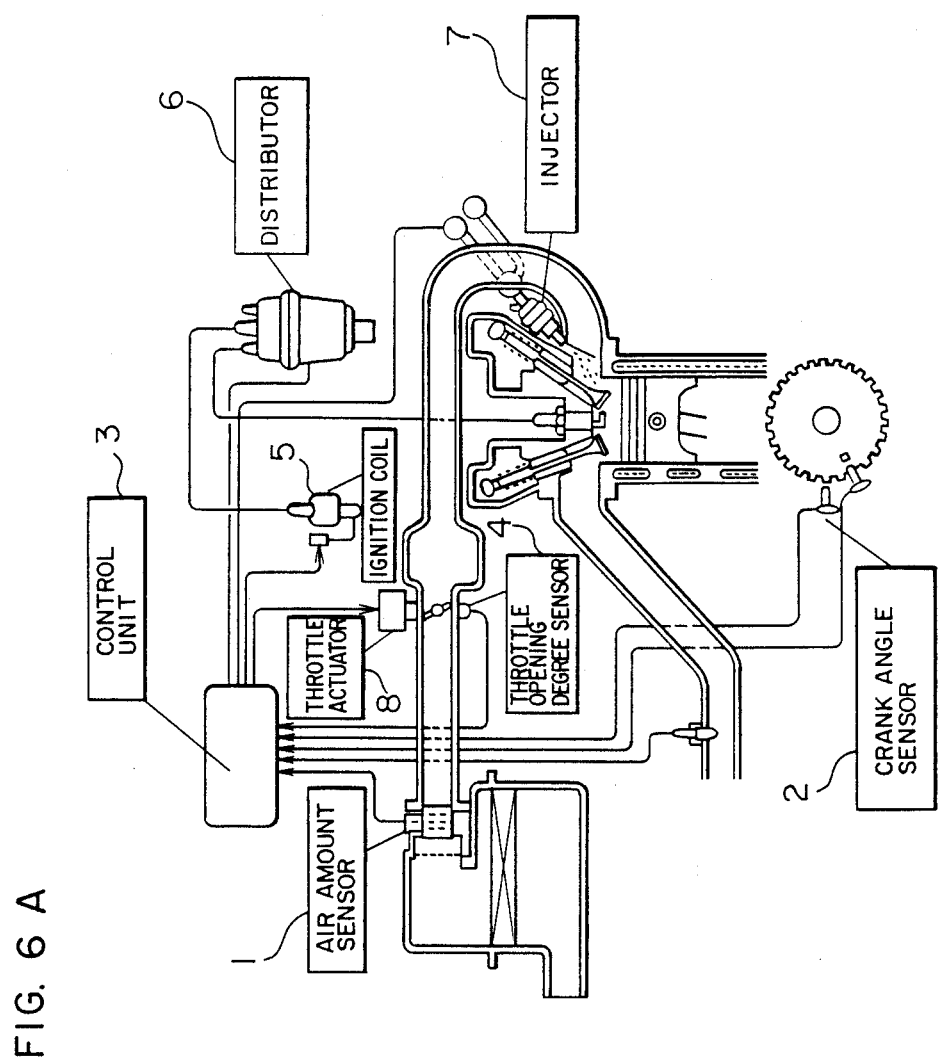
FIG. 6A is a diagram showing a system configuration.

A system configuration is shown in FIG. 6A. The amount of air taken into the engine is detected by an air amount sensor 1, and the resulting detection output is applied to a control unit 3. Further, the engine operating condition is detected by a crank angle sensor 2, the output of which is applied also to the control unit 3. The amount of air taken into the engine is determined by the throttle valve opening degree, which in turn is detected by a throttle valve opening degree sensor 4, and the resulting detection output is applied to the control unit.

In accordance with the outputs from the various sensors, the control unit 3 calculates the control amount of required for each actuator and produces a control signal. This control signal is used to control the ignition timing, so that a high voltage generated in an ignition coil 5 is distributed among the cylinders by a distributor 6. Further, a throttle actuator 8 is controlled to change the amount of air introduced into the engine. At the same time, the injector is controlled to change the amount of fuel supplied to the engine.

Now, the internal operation of the control unit 3 will be explained with reference to a block diagram.

Figure 6B:
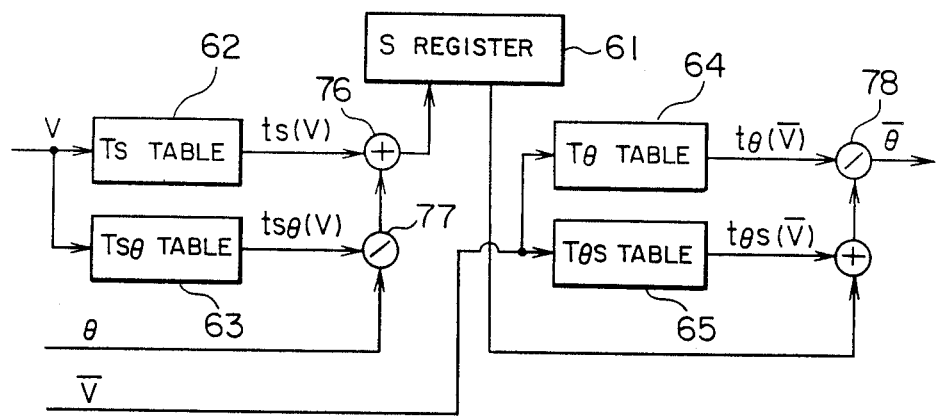
FIG. 6B is a circuit diagram showing a configuration of the essential parts of a second embodiment of the present invention.

FIG. 6B is a circuit diagram showing a configuration of the essential parts of a second embodiment of the present invention. The output terminals of the $T_s$ table 62 and $T_{s\theta}$ table 63 from which data is indexed with the vehicle speed v as an argument are connected to one of the input terminals of an adder 76 and a divider 77, respectively, and the other input terminal of the divider 77 is supplied with the throttle opening degree $\theta$ from the sensor 4. The output terminal of the divider 77, on the other hand, is connected to the other input terminal of the adder 76, the output terminal of which is connected to the input terminal of the S register of a memory. There are also provided a $T_\theta$ table 64 and a $T_{\theta s}$ table 65 supplied with the target vehicle speed v as an argument from a target setting device. The output terminals of the $T_{\theta s}$ table 65 and $T_\theta$ table 64 are connected to one of the input terminals of the adder 79 and the divider 78, respectively, and the output terminal of the S register 61 is connected to the other input terminal of the adder 79, the output terminal of which is connected to the other input terminal of the adder 78.

This second embodiment is governed by the following equation (6) for calculating the equivalent gradient S introduced from equations (1) and (3) and the following equation (7) for calculating the throttle opening degree $\theta$ introduced from the equations (4) and (5).

$$S = \left\{ \frac{1}{11.2}\left( 224.6 - \frac{1080}{v + 3.31} - 0.212\,v - 20 - 0.00437\,v^2 \right) \right\} - \left( \frac{0.229\,(v + 29.0)}{11.2} \right)\frac{1}{\theta} \quad (6)$$

$$= t_S(v) + t_{s\theta}(v) \cdot \frac{1}{\theta}$$

$$\theta = \frac{\{-0.229\,(v + 29.0)/11.2\}}{S + \left\{ \frac{1}{11.2}\left( 20 + 0.00437\,v^2 - 224.6 + \frac{1080}{v + 3.31} + 0.212\,v \right) \right\}} \quad (7)$$

$$= \frac{t_\theta(v)}{S + t_{\theta s}(v)}$$

In the second embodiment, the data $t_s(v)$ of equation (6) is stored in the $T_s$ table 62, and the data $t_{s\theta}(v)$ in the $T_{s\theta}$ table 63. In similar fashion, the data $t_\theta(v)$ of the equation (7) is contained in the $T_{74}$ table 64, and the data $t_{\theta s}(v)$ in the $T_{\theta s}$ table 65.

As a result, upon confirmation that the vehicle speed v is set to the target vehicle speed $\bar{v}$ at step 11 in FIG. 1, the numerical values $t_{s\theta}(v)$ and $t_{s\theta}(v)$ are indexed from the $T_s$ table 62 and the $T_{s\theta}$ table 63 with the vehicle speed v as an argument, and the value $t_{s\theta}(v)$ divided by the throttle opening degree $\theta$ is added to $t_s(v)$ thereby to calculate the equivalent gradient S, and the result thereof is written in the S register 61.

When the target vehicle speed $\bar{v}$ is thus applied, the numerical values $t_\theta(\bar{v})$ and $t_{\theta s}(\bar{v})$ are indexed from the $T_\theta$ table 64 and the $T_{\theta 2}$ table 65 with the target vehicle speed $\bar{v}$ as an argument, and the value $t_\theta(\bar{v})$ is divided by the sum of $t_{\theta s}(\bar{v})$ and the equivalent gradient S, thereby calculating the target throttle opening degree.

Figure 6C:
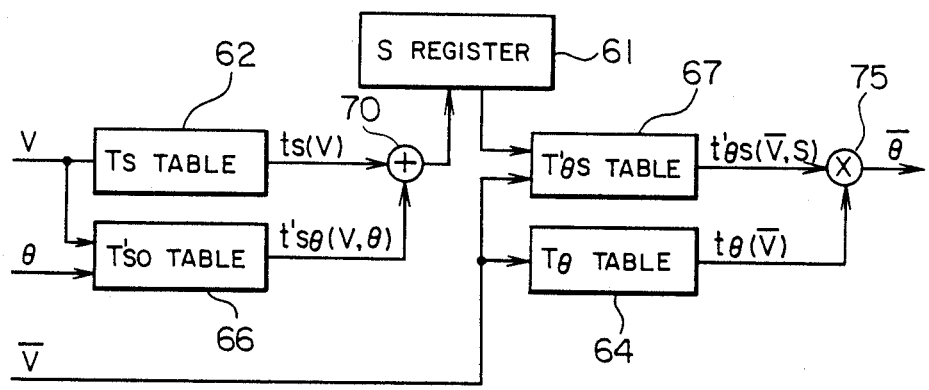
FIG. 6C is a circuit diagram showing a configuration of the essential parts of a third embodiment of the present invention.

FIG. 6C is a circuit diagram showing a configuration of the essential parts of a third embodiment. The output terminals of the $T_s$ table 62 from which data is indexed with the vehicle speed v from the detection means as an argument and the $T'_{s\theta}$ table 66 from which data is indexed with the vehicle speed v and the throttle opening degree $\theta$ as arguments are connected to the input terminals of the adder 70 respectively, and the output terminal of the adder 70 is connected to the input terminal of the S register 61. Also, there are provided a $T_\theta$ table 64 from which data is indexed with the target vehicle speed $\bar{v}$ as an argument and the $T'_{\theta s}$ table 67 from which data is indexed with the target vehicle speed $\bar{v}$ and the equivalent gradient S as arguments. The output terminals of these $T'_{\theta s}$ table 67 and the $T_\theta$ table 64 are connected to the input terminals of the multiplier 75 respectively.

In this third embodiment, the equations (6)' and (7)' resulting from the modification of equations (6) and (7) are applicable.

Specifically, in equation (6) $t_{s\theta}(v) \cdot 1/\theta$ is rewritten as $t'_{s\theta}(v, \theta)$ and in equation (7), $\{S + t_{\theta s}(v)\}^{-1}$ is rewritten as $t'_{\theta s}(v, S)$ thereby to obtain equations (6)' and (7)'.

$$S = t_s(v) + t'_{s\theta}(v, \theta) \quad (6)'$$

$$\theta = t_\theta(v) \cdot t'_{\theta s}(v, S) \quad (7)'$$

In the third embodiment, on the other hand, the data $t_s(v)$ is contained in the $T_s$ table 62, and the data $t'_{s\theta}(v, \theta)$ in the $T'_{s\theta}$ table 66. Further, the data $t_\theta$ is contained in the $T_\theta$ table 64, and the data $t'_{\theta s}(v, S)$ in the $T'_{\theta s}$ table 67.

As a result, according to the third embodiment, the numerical value $t'_{s\theta}(v, \theta)$ is indexed from $T'_{s\theta}$ table 66 with the vehicle speed v and the throttle opening degree $\theta$ as an argument, and the numerical value $t_s(v)$ is indexed from the $T_s$ table 62, so that both are added to each other at the adder 70 thereby to calculate the equivalent gradient S. Next, with a given target vehicle speed $\bar{v}$ as an argument, the $T_\theta$ table 64 is indexed to obtain the numerical value $t_s(v)$, and with the target vehicle speed $\bar{v}$ and the equivalent gradient S as an argument, the $T'_{\theta s}$ table 67 is indexed to obtain the numerical value $t'_{\theta s}(\bar{v}, S)$, so that both are multiplied with each other at the multiplier 75 thereby to calculate the target throttle opening degree $\theta$.

Figure 6D:
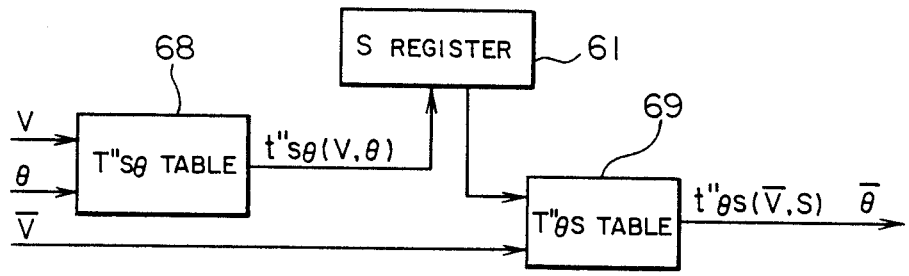
FIG. 6D is a circuit diagram showing a configuration of the essential parts of a fourth embodiment of the present invention.

FIG. 6D is a circuit diagram showing a configuration of the essential parts of a fourth embodiment, including the $T''_{s\theta}$ table 68 from which data is indexed with the vehicle speed v and the throttle opening degree $\theta$ as an argument. The output terminal of this $T''_{s\theta}$ table 68 is connected to the input terminal of the S register 61. There is also provided a $T''_{\theta s}$ table 69 from which data is indexed with the equivalent gradient S and the target vehicle speed $\bar{v}$ produced from the S register 61 as an argument.

In this fourth embodiment, equations (6)" and (7)" which are obtained by modification of equations (6) and (7) respectively are applied.

Specifically, in equation (6), $t_s(v) + t_{s\theta}(v) \cdot 1/\theta$ is set to $t''_{s\theta}(v, \theta)$, and equation (7), $$\frac{t_\theta(v)}{S + t_{\theta s}(v)}$$

is set as $t''_{\theta s}(v, s)$ thereby to obtain the equations (6)" and (7)".

$$S = t''_{s\theta}(v, \theta) \quad (6)''$$

$$\theta = t''_{\theta s}(v, s) \quad (7)''$$

In the fourth embodiment, the data $t''_{s\theta}(v, \theta)$ is contained in the $T''_{s\theta}$ table 68, and the data $t''_{\theta s}(v, S)$ in the $T''_{\theta s}$ table 69.

As a result, according to the fourth embodiment, the equivalent gradient S is obtained by indexing the $T''_{s\theta}$ table 68 with the vehicle speed v and the throttle opening degree $\theta$ as an argument, while the throttle opening degree $\theta$ for maintaining the target vehicle speed $\bar{v}$ by indexing the $T''_{\theta s}$ table 69 with the equivalent gradient S and the target vehicle speed $\bar{v}$ as an argument. This fourth embodiment reduces the time required for table indexing and calculation processing and saves the program capacity greatly as compared with the second and third embodiments.

As made clear by the equations (6), (7), (6)', (7)', (6)" and (7)" used for explanation of the second to fourth embodiments above, the first feature of the present invention is to calculate the equivalent gradient S as a resistance index representing the running resistance under given operating conditions from the vehicle speed v and the throttle opening degree $\theta$, and the second feature of the present invention is to calculate a throttle opening degree $\bar{\theta}$ such as to respond to the target vehicle speed $\bar{v}$ applied from the target setting means under the conditions of the equivalent gradient S mentioned above.

According to the present invention, it is possible to estimate the control amount of the operating elements required for realizing a control target value. In the conventional control systems for internal combustion engines, by contrast, a control amount set on the basis of a numerical value given from the ratio between the engine speed N and the supply air amount Q is used to maintain the present running conditions economically and safely. In these conventional systems, it is impossible to estimate the required control amount for the operating elements unlike in the embodiments described above.

As explained above, according to the present embodiment, the control amount for the operating elements satisfying the requirements of the prevailing load conditions and the target vehicle speed $\bar{v}$ is calculated for advance control, so that the control which is unrealizable by the conventional control systems for maintaining the prevailing operation is achieved without feedback compensation.

Figure 7:
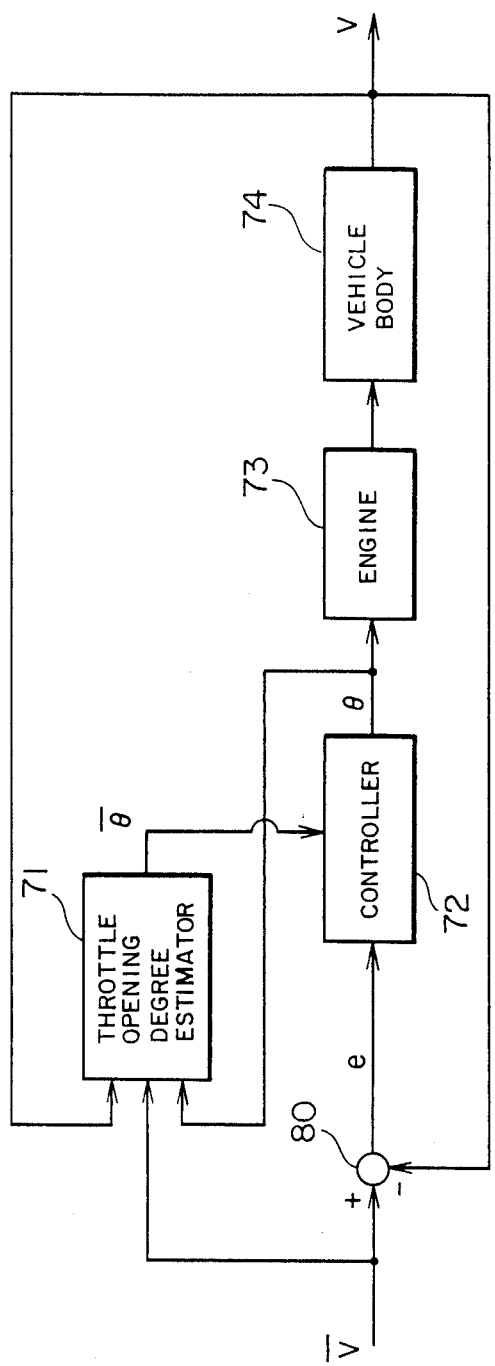
FIG. 7 is a circuit diagram showing a configuration of the essential parts of a fifth embodiment of the present invention.

FIG. 7 shows a fifth embodiment in which the present invention is applied to a general control system. The target vehicle speed $\bar{v}$ is applied to one of the input terminals of a subtractor 80, the output terminal of which is connected to the input terminal of a controller 72. The output terminal of the controller 72, on the other hand, is connected to the input terminal of an engine 73 which is connected to a vehicle body 74. The output terminal of a throttle valve opening degree estimator 71 supplied with a target vehicle speed $\bar{v}$ is connected to the controller 72, and the input terminal of the throttle valve opening degree estimator 71 is connected with the output terminals of the controller 72 and the vehicle body 74. The output terminal of the vehicle body 74 is connected to the other input terminal of the subtractor 76.

According to this fifth embodiment, the controller 72 for controlling the throttle opening degree $\theta$ is energized to reduce a control error $e = \bar{v} - v$ which may develop between the actual vehicle speed v and the target vehicle speed $\bar{v}$. In this control operation, the throttle opening $\bar{\theta}$ for maintaining the target vehicle speed $\bar{v}$ estimated by the throttle opening degree estimator 71 is recognized, so that the vehicle speed v is required to the target vehicle speed $\bar{v}$ while effecting the advance control of the control amount by finite time regulation or shortest time control.

This advance control is possible because the throttle opening degree $\bar{\theta}$ is recognizable immediately after application of the target vehicle speed $\bar{v}$.

Figure 8:
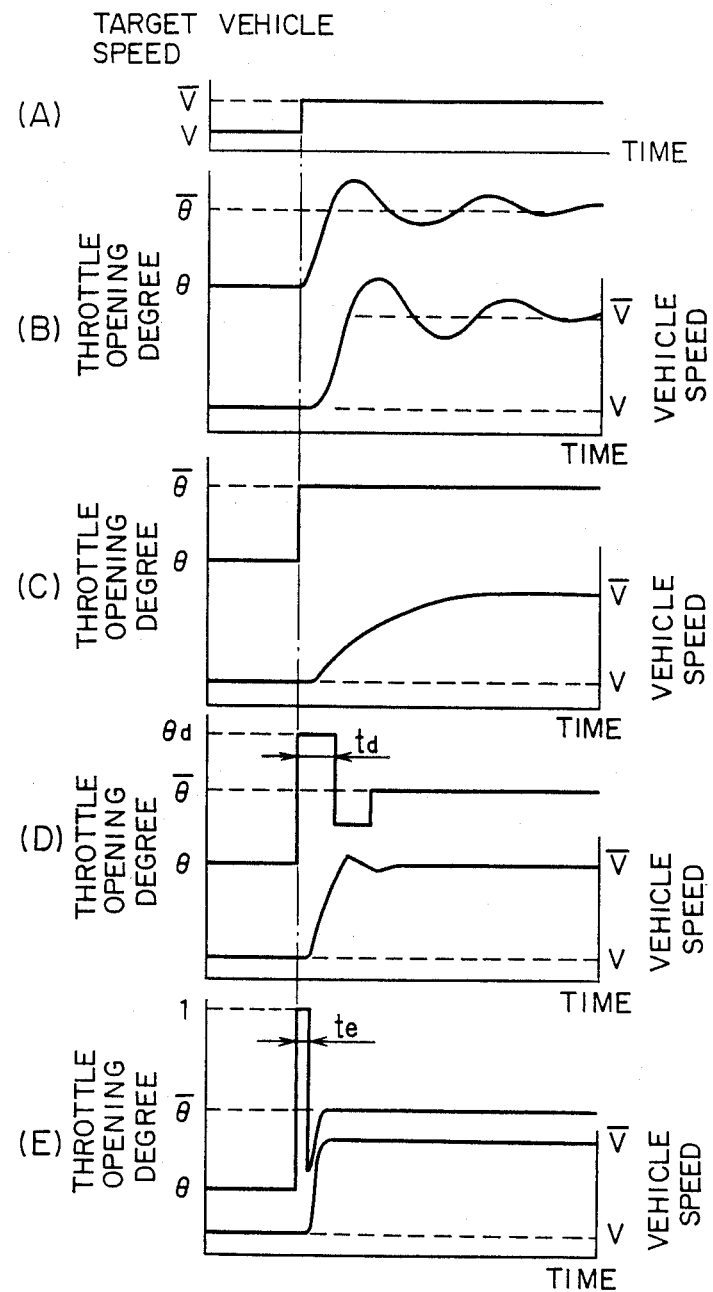
FIGS. 8(A) to 8(E) are time charts for explaining the effect of the fifth embodiment of the present invention.

FIGS. 8(A) to 8(E) are diagrams showing the effect of the fifth embodiment. If the target vehicle speed $\bar{v}$ is set in the manner shown in FIG. 8(A), assume that the system lacks the throttle opening degree estimator 71 and that an ordinary PID control is effected by the controller 72. By feeding back the control error $\underline{e}$, the controller 72 produces a control amount $\theta$ resulting from a combination of proportionality, integration and differentiation as shown in FIG. 8(B). Also, the response of the vehicle speed v is delayed by the transfer delay time of the engine 73 and the vehicle body 74 from the time point of change in the control amount $\theta$. This response delay is a direct cause of delaying the control operation, thereby deteriorating the regulation characteristics.

A control system including the throttle opening degree estimator 71, on the other hand, has a vehicle speed response as shown in FIGS. 8(C), 8(D) and 8(E), in which FIG. 8(C) represents the case in which the throttle opening degree $\bar{\theta}$ is set in synchronism with the setting of a target value. In this case, the vehicle speed v rises with a delay corresponding to the transfer delay of the engine 73 and the vehicle body 74, and is regulated to the target vehicle speed $\bar{v}$ while representing the response of a multi-delay system.

FIG. 8(D) shows a case in which the finite time regulation is attempted by a simple operation of the throttle opening degree. In this case, a reasonable rise, a slight overshoot and an undershoot result in the regulation time being greatly reduced. Also, FIG. 8(E) represents a case of the shortest time control, in which the throttle valve is full open in synchronism with the target setting, and is closed considerably immediately before the vehicle speed response reaches a target value. In this case of throttle opening degree $\theta$ control, the ideal shortest time control is realized as shown. The control factors $\theta_d$ and $t_d(e)$ in FIG. 8(D) and $t_e$ in FIG. 8(E) are determined by the change in target value or the time constant and transfer delay time of the engine 73 and the vehicle body 74.

In this way, according to the fifth embodiment, the required throttle opening degree $\theta$ is estimated at the same time as the target vehicle speed $\bar{v}$ is set, and therefore the finite time regulation or shortest time control which is impossible with the conventional PID control becomes possible, thus assuring high-speed and stable response of the vehicle body.

A sixth embodiment of the present invention is configured with a further improved adaptability by compensation and learning functions.

As seen from the description of each embodiment above, the relativity of the present invention gives each embodiment a feature of a high adaptation control. Equations (6) and (7) indicate this point conspicuously. The equation (6) for calculating the equivalent gradient S from the vehicle speed v and the throttle opening degree $\theta$ is induced from the equations (1) and (2), while the total inversion of the process of induction results in the equation (7) for calculating the throttle opening degree $\theta$ from the equivalent gradient S and the vehicle speed v. The error included in the calculation of the equivalent gradient S is thus offset by following the calculation process inversely in equation (7). Each embodiment, therefore, has a high adaptation controllability without taking any special measures.

The above-mentioned error, however, is caused by mismatching of parameters of a mathematical model or variations in the engine characteristics. In many cases, the error is offset to achieve a high adaptation controllability. In the case of an error changing with the vehicle speed, however, the effect thereof would be presented conspicuously when a target value is changed greatly.

In order to reduce the effect of this error factor, the sixth embodiment is so configured as to calculate the throttle opening degree $\theta$ on the basis of the equation (8) to which a compensation term $t_{\theta c}(v)$ that is a function of the vehicle speed is added to the equation (7).

$$\theta = \frac{t_\theta(v)}{S + t_{\theta c}(v)} + t_{\theta c}(v) \quad (8)$$

In this case, the compensation term $t_{\theta c}(v)$ may be indexed from the numerical table $T_{\theta c}(v)$ with the vehicle speed v as an argument.

Also, in the case where the degree of effect of the error changing with vehicle speed undergoes a change with time due to the heating conditions, wear or deterioration of the engine, a learning function may be introduced to assure an always accurate estimation of the operation amount. The learning function is realizable in the manner mentioned below.

A throttle opening degree $\bar{\theta}$ estimated immediately after the change of the target vehicle speed to $\bar{v}$ is stored, and the difference with a measured throttle opening degree $\hat{\theta}$ is accumulated in the manner shown in equation (9) thereby to compensate for the estimated amount by learning.

$$t_{\theta c}(v) = a(\bar{\theta} - \hat{\theta}) + t_{\theta c}(v) \quad (9)$$

In equation (9) above, the coefficient a is a learning rate. If a configuration for learning compensation of an estimated value as shown in equation (9) is used, a control system is realized that can be fully adaptable to the dynamic variations of the engine characteristics.

A seventh embodiment of the present invention is configured in such a way as to effect speed control for holding the vehicle speed at a constant value by application of the present invention.

Figure 9A:
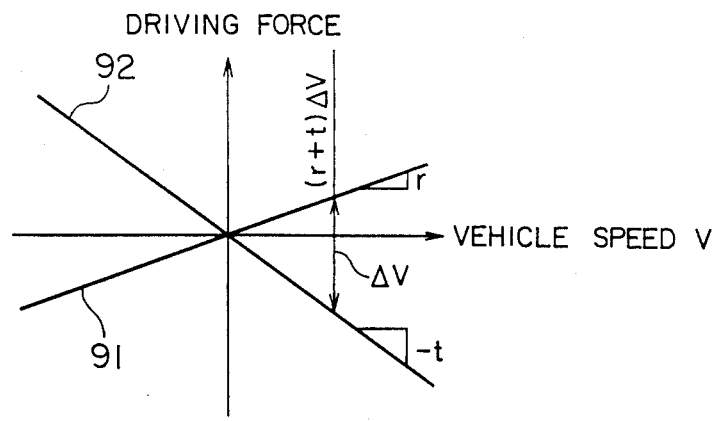
FIGS. 9(A) to 9(B) are characteristic diagrams for explaining the operation of a seventh embodiment of the present invention.
Figure 9B:
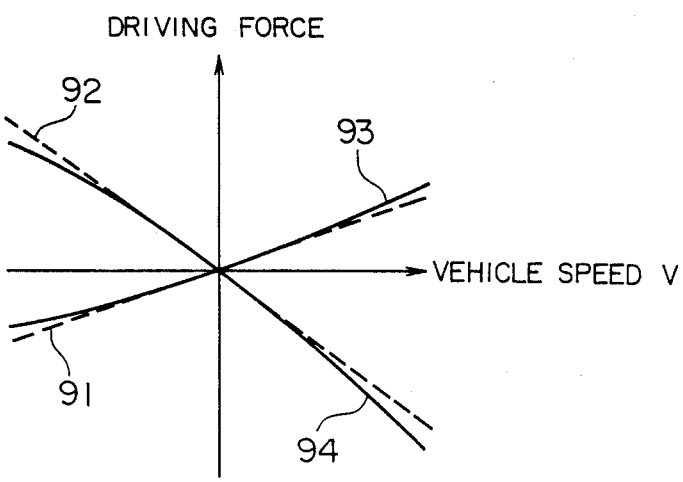
Figure 10:
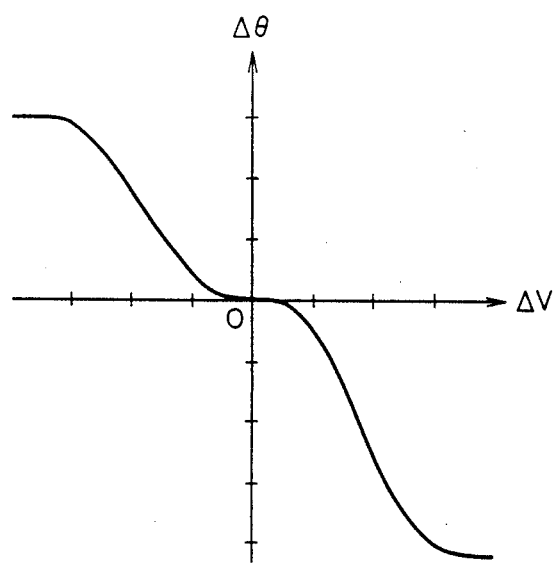
FIG. 10 is a characteristic diagram for explaining the operation of the seventh embodiment of the present invention.

FIGS. 9(A) and 9(B) are diagrams for explaining the operation of the seventh embodiment, in which FIG. 9(A) shows a running resistance curve and a driving force curve containing the origin as approximated by straight lines 91 and 92 passing through the origin respectively on a vehicle speed/driving force curve with the origin as a target vehicle speed to be held. The gradient of the straight line 91 is given as r, and the gradient of the straight line 92 as −t. The increment $\Delta\theta$ of the throttle opening degree, on the other hand, is expressed by the equation (10) from the error $\Delta v$ with the target vehicle speed with k as a coefficient.

$$\Delta\theta = -k(r+t)\Delta v \quad (10)$$

The value $(r+t)\Delta v$ in the equation (10) represents a driving force to be reduced for regulating the target vehicle speed with the increase of vehicle speed by $\Delta v$. The required reduction $\Delta\theta$ of the throttle angle is given by multiplying the coefficient k by the driving force $(r+t) \Delta v$.

Further, the error developed by linearization is smaller than the actually required driving force in area represented by $\Delta v > 0$ by the difference between the downwardly convex running resistance curve 93 and the approximation curve 91 or between the upwardly convex driving force curve 94 and the approximation curve 92 respectively shown in FIG. 9(B). In the area represented by $\Delta v < 0$, by contrast, the error assumes a value larger by the difference.

In order to reduce this error, the value of the coefficient k is changed in accordance with the positive or negative value of $\Delta v$ as shown in equation (11).

It will thus be understood from the foregoing detailed explanation that according to the present invention, the equivalent gradient providing a resistance index under the prevailing load conditions is calculated thereby to determine the control amount of the operating elements required for maintaining a target value immediately after the setting thereof. As a result, a finite time regulation response control or shortest time control is effected based on the advance control of the operating elements immediately after setting of a target value, thereby achieving a control system for internal combustion engines having a high stability and superior response.

We claim:

1. A control system for the internal combustion engine, wherein operating elements are controlled by control means to control the operating conditions of the internal combustion engine to a target value set by target value setting means, the system comprising:
   detection means for detecting the operating conditions of the internal combustion engine and the control conditions of the operating elements;
   first calculation means for calculating a resistance index specifying a driving force corresponding to the operating conditions under prevailing load conditions from the control amount of the operating elements and the operating conditions of the internal combustion engine detected by the detection means;
   second calculation means for calculating and supplying to the control means a control amount for control of the operating elements; and
   memory means for storing information required for calculation by the first and second calculation means in such a way that the information is capable of being rewritten.

2. A control system for the internal combustion engine according to claim 1, wherein said memory mean is configured to store information relating to steady and accelerated running of a vehicle driven by the internal combustion engine, and said first calculation means includes means for calculating the resistance index for a given running condition of the vehicle.

3. A control system for the internal combustion engine according to claim 1, wherein said memory means stores operating characteristics of the internal combustion engine and the second calculation means includes means for calculating the control amount of the operating elements in such a manner as to maintain a vehicle speed corresponding to accelerator pedal operation of the vehicle driven by the internal combustion engine.

4. A control system according to claim 1, wherein said second calculation means comprises means for calculating said control amount using the resistance index calculated by said first calculation means.

5. A control system according to claim 1, further including memory means for storing data in accordance with an operating condition of the engine, said first calculation means including means for reading data from said memory means in accordance with a detected operating condition to calculate said resistance index.

6. A control system according to claim 1, further including means for comparing the control amount calculated by said second calculation means with a target value of control amount to detect any difference therebetween, and means for correcting said calculated control amount in accordance with said difference.

7. A control system according to claim 1, wherein said control amount is throttle opening of a throttle valve.

8. A control system according to claim 1 wherein said detection means detects vehicle speed as an operating condition of the internal combustion engine.

9. A control system according to claim 1, wherein said first calculation means operates periodically with a first predetermined period to calculate a value of resistance index for current operating conditions of the internal combustion engine.

10. A control system according to claim 9, wherein said second calculation means operates periodically with a second predetermined period to calculate the control amount of the operating elements.

11. A method of controlling an operating condition of an internal combustion engine in a vehicle by controlling an operating element thereof, comprising the steps of:
   (a) setting a target value for an operating condition of the internal combustion engine;
   (b) measuring an instantaneous value of said operating condition of said internal combustion engine and a control amount of said operating element;
   (c) comparing said target value to the measured value of said operating condition;
   (d) if said target value corresponds to said measured value of said operating condition in step (c),
      (d1) determining a running resistance of the vehicle while based on said measured value of said operating condition and a control amount of said operating element, and
      (d2) storing in memory a value corresponding to the running resistance determined in substep (d1);
   (e) if said target value does not correspond to said measured value of said operating condition in step (c)
      (e1) determining a required driving force of the vehicle on the basis of the instantaneous value of said operating condition and said value stored in memory which corresponds to the running resistance of the vehicle, and
      (e2) calculating a required control amount based on the required driving force determined in substep (e1); and
   (f) controlling said operating element on the basis of said calculated control amount.

12. A method of controlling an operating condition of an internal combustion engine according to claim 11, wherein said step (d) further includes:
   (d3) repeating substeps (d1) and (d2) periodically while said target value corresponds to said measured value of said operating condition to update said value stored in memory which corresponds to the running resistance of the vehicle 13. A method of controlling an operating condition of an internal combustion engine according to claim 11, wherein said step (e) further includes:
(e3) repeating substeps (e1) and (e2) periodically while said target value does not correspond to said measured value of said operating condition to update the control amount used in step (f) for controlling said operating element.

14. A method of controlling an operating condition of an internal combustion engine according to claim 11, wherein said operating condition is vehicle speed.

15. A method of controlling an operating condition of an internal combustion engine according to claim 11, wherein said operating element is a throttle valve of said internal combustion engine.

16. A method of controlling an operating condition of an internal combustion engine according to claim 11 wherein the vehicle includes a power transmission system having a variable speed change ratio, and wherein the determination of the driving force in substep (e1) and the calculation of the required control amount in substep (e2) include the speed change ratio of said power transmission system.

17. A method of controlling an operating condition of an internal combustion engine according to claim 11, wherein said step (f) comprises comparing said measured control amount to said calculated control amount to detect any difference therebetween and controlling said operating element to reduce said difference to zero.

18. A method of controlling an operating condition of an internal combustion engine according to claim 11, wherein said step (f) comprises comparing said measured control amount to said calculated control amount to detect any difference therebetween, controlling said operating element so as to exceed said calculated control amount by a predetermined amount for a predetermined period, and then controlling said operating element to reduce said difference to zero.

19. A method of controlling an operating condition of an internal combustion engine according to claim 11, wherein said value stored in memory corresponding to the running resistance of the vehicle comprises an equivalent gradient which is a function of said running resistance and said operating condition.

20. A method of controlling an operating condition of an internal combustion engine according to claim 19, wherein said substep (d1) comprises storing in memory values relating to running resistance for calculating values of equivalent gradient for respective values of said operating condition, reading out of memory a value relating to running resistance for a measured value of operating condition and calculating a value of equivalent gradient using a measured value of control amount of said operating element.

21. A method of controlling an operating condition of an internal combustion engine according to claim 19, wherein said substep (d1) comprises storing in memory values relating to running resistance for determining values of equivalent gradient for respective values of operating condition and control amount of said operating element, reading out of memory a value related to running resistance for a measured value of operating condition and control amount and calculating a value of equivalent gradient using said value read out of memory.

* * * * *